FREE-FALL TEST FACILITY

Original Filed March 12, 1965 2 Sheets-Sheet 1

INVENTOR.
HOWARD L. PAYNTER
VERNAL M. TYLER
DENNIS F. SATTERLEE
BY Phillip L. DeClement
ATTORNEY

FREE-FALL TEST FACILITY

Original Filed March 12, 1965 2 Sheets-Sheet 2

INVENTOR.
HOWARD L. PAYNTER
VERNAL M. TYLER
DENNIS F. SATTERLEE
BY
Philip L. DeArment
ATTORNEY United States Patent Office Re. 26,784
Reissued Feb. 3, 1970

26,784

FREE-FALL TEST FACILITY

Howard L. Paynter, Littleton, Colo., Vernal M. Tyler, Hazelwood, Mo., and Dennis F. Satterlee, Littleton, Colo., assignors to Martin-Marietta Corporation, Baltimore, Md., a corporation of Maryland Original No. 3,339,418, dated Sept. 5, 1967, Ser. No. 439,336, Mar. 12, 1965. Application for reissue Oct. 18, 1967, Ser. No. 682,699

Int. Cl. G01p *1/02*

U.S. Cl. 73—432 13 Claims

Matter enclosed in heavy brackets [ ] appears in the original patent but forms no part of this reissue specification; matter printed in italics indicates the additions made by reissue.

*ABSTRACT OF THE DISCLOSURE*

*The behavior of a test specimen in a reduced gravity or fractional gravity environment is examined by dropping a test capsule from a drop tower along a vertical drop path. The test capsule has a container movably supported therein for housing a test specimen and constant force springs accelerate the container relative to the test capsule during free-fall of the test capsule.*

This invention relates to a free-fall test facility and more particularly to a test cell which is allowed to drop in a reduced gravity ("reduced —g") or fractional gravity (fractional —g) environment so that certain phenomena, and particularly the phenomena of the molecular forces in liquids, may be observed under such conditions.

This reduced —g or fractional —g situation exists in orbital space vehicles and particularly those vehicles which are in a coasting orbit such that water, propellants and other liquids used during space travel behave differently than in a more mundane environment. Thus, it is necessary to become familiar with this phenomenal behavior of liquids so that they may be controlled during space flight in an acceptable manner. For example, it has been found that when the gravitational force is removed, the molecular forces and capillary forces become controlling, resulting in rather unusual positioning of a liquid within its container. With respect to propellants, it is necessary to control the position of the fluid within the container so that it will be or can be located at the outlet, as for the restarting of the vehicle engine.

Previous attempts to provide such devices have been unsatisfactory. Some of these devices have been very complex, making the cost prohibitive and the reliability uncertain. Other such devices have introduced untolerable errors into the system resulting in unreliable measurements and data.

Among the objects of this invention are to provide a free-fall test facility for conducting tests of the behavior of various substances, particularly liquids, in a reduced gravity or fractional gravity environment; to provide such a test facility having an outer capsule with a test cell therein, the test cell being adapted to fall within the outer capsule as it is dropped; to provide such a test facility which utilizes constant force springs to provide a reduced gravity environment; to provide such a test facility in which a constant force spring is connected between the test cell and the outer capsule; to provide such a test facility in which a vacuum is maintained in the outer capsule; to provide an alternative test facility having an outer capsule, a smaller inner capsule within said outer capsule and a test cell within the inner capsule, the inner capsule being adapted to fall within the outer capsule as it is dropped and the test cell being adapted to fall within the inner capsule as it falls; to provide such an alternative test facility in which a constant force spring is provided between the test cell and the inner capsule; to provide such an alternative test facility in which a vacuum is provided in both the outer and inner capsules; to provide such a test facility in which the force of the constant force spring may be changed to create different fractional gravity environments; to provide such a test facility which is simple in construction; and to provide such a test facility which is highly effective in operation.

Additional objects and novel features will become apparent from the description which follows, taken in conjunction with the accompanying drawings in which.

Figure 1:
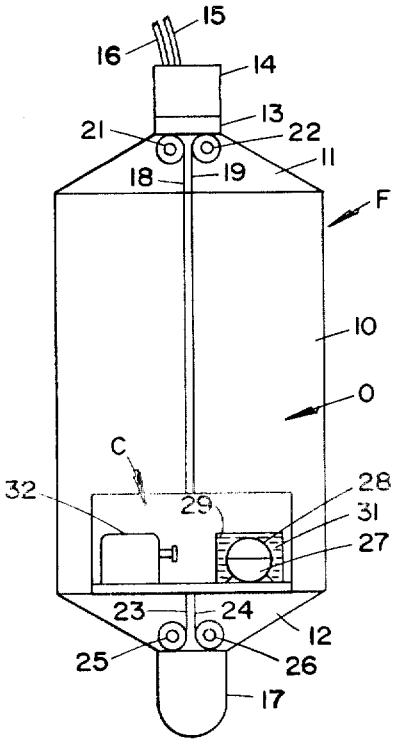
FIG. 1 is a diagrammatic, vertical section through a test facility of this invention showing a test cell suspended near the bottom of an outer capsule prior to a free-fall test.
Figure 2:
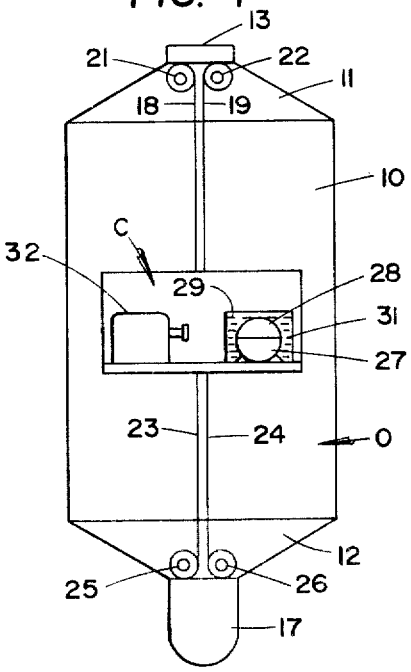
FIG. 2 is a diagrammatic, vertical section, similar to FIG. 1, but showing the position of the test cell within the outer capsule about halfway through a free-fall test.
Figure 3:
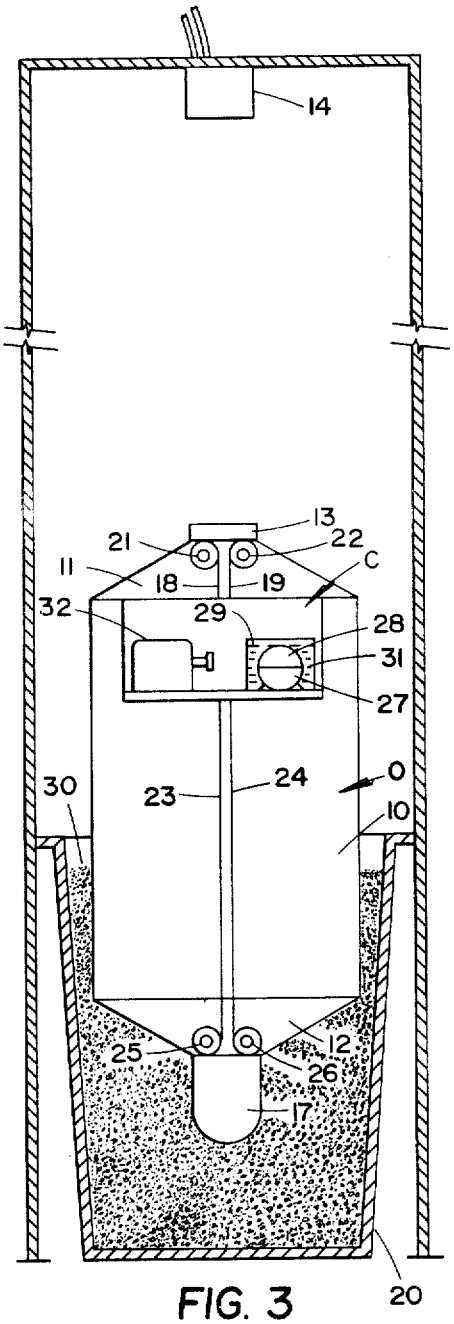
FIG. 3 is a diagrammatic, vertical section, similar to FIG. 1, but showing the position of the test cell within the capsule at the end of free-fall test [;] *and the associated drop tower*

In accordance with this invention, a test facility F is provided in FIGS. 1–3 which includes an outer test capsule O, provided with a long, cylindrical body 10, having a truncated conical upper portion 11 and a similar truncated conical lower portion 12. A cap 13, conveniently made of magnetic material, closes the upper end of upper portion 11 and is adapted to hold outer capsule O against an electromagnet 14 which may be energized through wires 15 and 16. Thus, prior to a free-fall test, outer capsule O is held by energized electromagnet 14, but upon deenergization of the magnet, the capsule is permitted to fall and the test is run. The lower end of lower portion 12 is closed by a rounded nose 17 which is adapted to absorb some of the forces of impact at the end of the fall. Advantageously test facility F may be decelerated by falling into a suitable decelerating device, such as a bin *20* filled with wheat *30* [(not shown)].

A test cell C is provided in outer capsule O. If desired, the top of test cell C may be made of magnetic material to hold it against cap 13 when electromagnet 14 is energized. The outer capsule O is evacuated to a vacuum, such as 3.0 mm. Hg. Thus, when electromagnet 14 is deenergized, both outer capsule O and test cell C will start to fall. However, outer capsule O will be slowed by the resistance or drag caused by the ambient air whereas, test cell O will fall within the vacuum of outer capsule O and will therefore fall at a faster rate and provide a zero —g environment within the test cell. Of course, other means for holding and releasing the capsule other than an electromagnet may be used.

By supporting the test cell C within the capsule by constant force springs, such as "Neg'ator" springs manufactured by Hunter Spring Company of Hatfield, Pennsylvania, the acceleration of the test cell can be increased to provide a negative gravity ("negative —g") environment within the test cell or its acceleration can be decreased to provide a reduced —g environment within the test cell. In both the embodiments of FIGS. 1–3 and FIGS. 4–6, the reduced —g arrangement is described wherein the relative position of the test cell within the capsule changes from bottom to top due to the force exerted on the test cell by the constant force springs so that a fractional —g environment is provided during the test. However, the force values of the springs could be chosen so that the test cell moves from the top of the capsule to the bottom during the free-fall test to create a negative —g environment, if desired.

In the embodiment of FIGS. 1–3, test cell C is suspended from the lower end of a pair of constant force springs 18 and 19 which are mounted on and adapted to be wound around spindles 21 and 22, respectively, which are journaled in suitable bearings (not shown) attached to opposite sides of upper portion 11. Lower pair of constant force springs 23 and 24 have the upper end thereof attached to the bottom of test cell C and the other end of each spring wound around spindles 25 and 26, respectively, which are journaled in suitable bearings (not shown) attached to opposite sides of lower portion 12. By choosing the springs so that the force exerted by springs 18 and 19 is slightly greater than that exerted by Neg'ator springs 23 and 24, test cell C can be caused to move upwardly within the tubular body 10 of outer capsule O during a free-fall test. Thus, a fractional —g environment will be created within the test cell. Accordingly, as the test facility F falls and reaches the midpoint of its fall, the test cell will reach a position above midway in tubular body 10, as in FIG. 2. As the test facility F continues to fall, test cell C will continue to move upwardly in outer capsule O so that at the end of the fall the test cell C will be near the top of outer capsule O, as shown in FIG. 3. It will be understood, of course, that constant force springs having different values may be chosen to vary the fractional —g environment in the test cell. Thus, for a given set of springs, test cell C may only move a portion of the distance from the bottom of outer capsule O to the top thereof. Also, if desired, only a single constant force spring or a single set of constant force springs, such as attached between the top of the test cell C and the top of the capsule O, can be used with the test cell sitting at the bottom of the outer capsule prior to a fractional —g test. Similarly, such an arrangement of constant force springs could be provided between the bottom of the test cell and the bottom of the capsule if a negative —g test is to be run, with the test cell being suspended adjacent the top of the capsule by a fusible wire prior to the test. The wire will then be fused as the test begins allowing the constant force spring or springs to exert a downward force on the test cell. For convenience, a constant torque motor made up of a plurality of constant force springs, connected to the test cell by a single cable, could be used.

Advantageously, test cell C may contain a test specimen 27 in a flask 28 positioned in a Plexiglas box 29 filled with water 31. A camera 32 is also mounted in the test cell and is positioned so as to observe the reaction of the test specimen 27 during the free-fall drop. The water 31 within the Plexiglas 29 serves as an aid to eliminating photographic distortion. Conveniently, a planar lighting technique is used wherein a narrow plane of light is directed through the box at right angles to the camera.

The embodiment shown in FIGS. 1–3 is adequate for tests where the distance through which the test facility falls is quite small. However, where the drop distance is great, certain errors which may creep into the system become significant. For example, because of the drag from the atmosphere on outer capsule O, it will accelerate at a slightly slower rate than the acceleration of gravity. This resultant force could be transmitted from the outer capsule O to the test cell C through Neg'ator springs 18, 19, 23 and 24. Since it is virtually impossible to accurately measure this force, the test results, particularly during a short fall may be valueless. Furthermore, this arrangement may be adversely affected by the wind gusts. To overcome this problem a small free-falling inner capsule may be provided within an outer capsule O', as in the embodiment of FIG. 4. The outer capsule O' is identical in construction to outer capsule O' of the previous embodiment, but the cylindrical body 10' may be longer, if desired to accommodate inner capsule I. A truncated upper portion 11' and truncated lower portion 12' are connected to the ends of body 10'. A cap 13', made of magnetic material closes the upper end of upper portion 11' and is adapted to hold outer capsule O' against an electromagnet 14' which may be energized through wires 15' and 15'. The lower end of lower portion 12' is closed by a rounded nose 17'. The inner capsule I is constructed similarly to outer capsule O' but is somewhat smaller and does not have a nose 17'. This inner capsule includes a cylindrical body 33, a truncated upper portion 34 and a truncated lower portion 35, as shown. The upper portion is advantageously provided with a cap 36 which is conveniently made of magnetic material and is attracted to cap 13' by the electromagnetic force of electromagnet 14' prior to a test, as in FIG. 4. Lower portion 35 is conveniently closed by a flat circular plate 37.

The test cell C' is supported by a pair of upper constant force springs 18' and 19' which are wound on spindles 21' and 22', respectively, journaled in suitable bearings (not shown) on opposite sides of upper portion 34 of inner capsule I. Lower Neg'ator springs 23' and 24' each have one end attached to the bottom of test cell C' and the other end is wound around spindles 25' and 26', respectively, which are journaled in suitable bearings (not shown) on opposite sides of lower portion 35 of the inner cell inner capsule I. Conveniently, the air in both outer capsule O' and inner capsule I may be evacuated prior to a test.

Conveniently, test cell C' contains similar test apparatus as test cell C. In this regard, the test cell may be provided with a test specimen 27', which may be a liquid in a flask 28' positioned in a Plexiglas box 29' which is filled with water 31'. A camera 32' is also mounted in the test cell and is positioned so as to observe the reaction of the test specimen 27' during the fractional or reduced gravity situation. The box 29' is filled with water to avoid the camera observing a distorted image.

Figure 4:
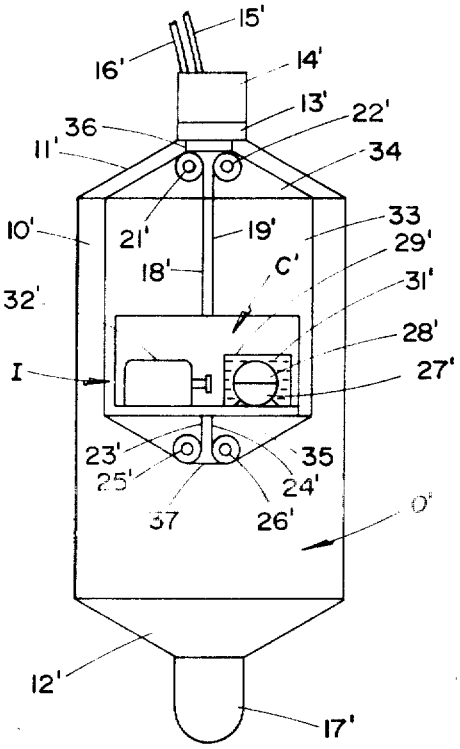
FIG. 4 is a diagrammatic, vertical section, similar to FIG. 1, of an alternative test facility but having a smaller inner capsule suspended near the top of the outer capsule and a test cell suspended adjacent the bottom of the inner capsule prior to a free-fall test.
Figure 5:
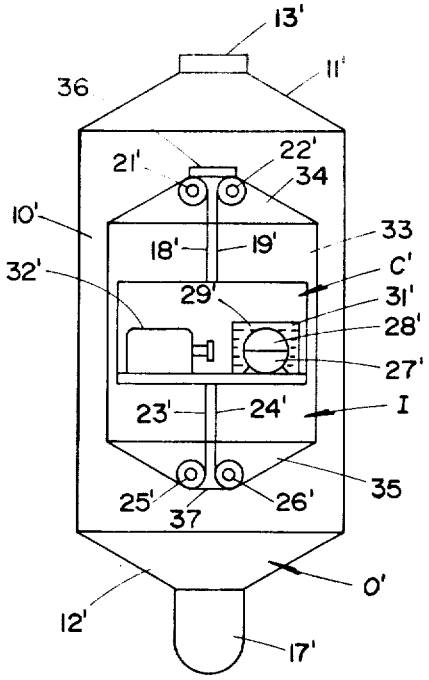
FIG. 5 is a diagrammatic, vertical section similar to FIG. 4, but showing the position of the inner capsule and test cell about halfway through a free-fall test.

Thus, it can be seen that when the power to electromagnet 14' is cut off both the outer and inner capsule will begin to fall. However, the inner capsule I will fall at slightly faster rate than the outer capsule O' because the outer capsule will be slowed down by the air of the surrounding atmosphere whereas the inner capsule I is falling in the vacuum within outer capsule O'. The relative positions of the capsules during a test drop can be seen in FIGS. 5 and 6. In FIG. 5, the inner capsule has fallen to a position about midway in the outer capsule at the midpoint of the test drop. At the time of impact, however, the inner capsule I will be at the lower end of outer capsule O', as in FIG. 6. During the free-fall test, the constant force springs will cause the test cell C' to move upwardly within the inner capsule I, as in FIGS. 4–6, thereby subjecting the test specimen 27' to a fractional —g environment. Of course, the springs could be chosen so that they exert a downward force on the test cell, if desired, to subject the test specimen to a negative —g environment. As in the previous embodiment, the test cell need only be supported from one end by one or more constant force springs or by a cable connected to a constant torque motor, the other end being held by a fusible wire or other means prior to the test when a negative —g test is to be run or allowed to sit on the bottom of the inner test capsule prior to a fractional —g test.

As can readily be seen, any wind gusts which may affect the movement of outer capsule O' will not affect inner capsule I or test cell C' within the inner capsule.

Thus, the test cell C' is completely isolated from outside conditions.

Figure 6:
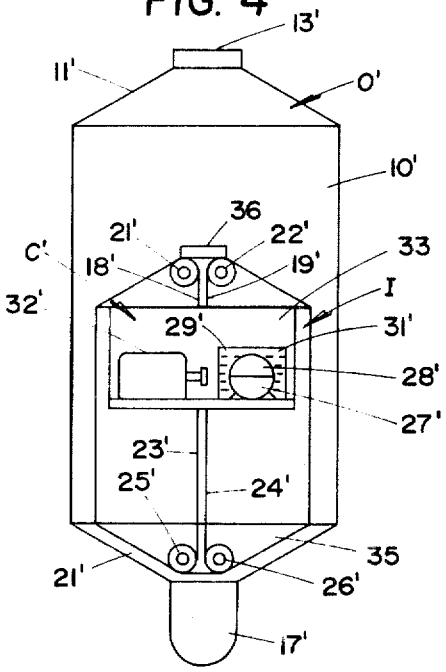
FIG. 6 is a diagrammatic, vertical section, similar to FIG. 4, but showing the position of the inner capsule and the test cell at the end of a free-fall test.

Thus, the objects and novel features hereinbefore set forth have been fulfilled to a marked degree. A test capsule has been provided for conducting tests of the reaction of various substances in a negative gravity or fractional gravity environment. Furthermore, the test capsule utilizes constant force springs to provide an acceleration other than zero gravity. In the embodiment of FIGS. 1–3 the test cell is connected to the test capsule by means of the constant force springs and a vacuum is maintained in the outer test capsule so that the test cell will fall without being subjected to the drag of the atmosphere. An alternative capsule arrangement is shown in FIGS. 4–6 in which an inner capsule is provided within the outer capsule and falls freely within the outer capsule which has a vacuum therein. The test cell is connected between the upper and lower ends of the inner test capsule by means of constant force springs and a vacuum is also provided in the inner capsule. The constant force springs provide for an acceleration of the test cell at a lesser or greater rate than the rate of gravity, creating a fractional —g or negative —g environment in the test cell.

Although a preferred and alternative form of this invention have been illustrated and described, it will be understood that various changes and variations may be made and that the features of one embodiment may be incorporated in the other embodiment, all without departing from the spirit and scope of this invention.

What is claimed is:

1. A test drop facility for conducting experiments in a fractional, reduced or negative gravity environment comprising:

an elongated, closed test capsule, adapted to be dropped from a tower;

a test cell mounted within said capsule for containing a test specimen;

a first constant force spring interconnected between the top of said test capsule and the top of said test cell; and a second constant force spring interconnected between the bottom of said test capsule and said test cell, the force exerted by one of said constant force springs being greater than that exerted by the other constant force spring to subject said test specimen to a reduced gravity environment.

2. A test drop facility, as set forth in claim 1, wherein the force exerted by said first constant force spring is greater than the force exerted by said second constant force spring to subject said test specimen to a fractional gravity environment.

3. A test drop facility, for conducting experiments in a fractional gravity or negative gravity environment including:

an elongated outer capsule;

a smaller free-falling elongated inner capsule within said outer capsule adapted to fall from the upper to the lower end of said outer capsule when said outer capsule is dropped;

releasable attaching means for attaching said inner capsule to the top of said outer capsule;

a test cell within said inner capsule for containing a test specimen; and a constant force spring extending between one end of said inner capsule and said test cell for exerting a force on said test cell so that said test cell accelerates at a different rate of acceleration than said inner capsule to subject said test specimen to a fractional gravity or negative gravity environment.

4. A test drop facility, as set forth in claim 3, including:

a first constant force spring interconnected between the top of said inner capsule and the top of test cell; and a second constant force spring interconnected between the bottom of said inner capsule and said test cell, the force exerted by one of said constant force springs being greater than that exerted by the other constant force spring to subject said test specimen to a reduced gravity environment.

5. A test drop facility, as set forth in claim 4, wherein the force exerted by said first constant force spring is greater than the force exerted by said second constant force spring to subject said test specimen to a fractional gravity environment.

6. A test drop facility, as set forth in claim 3, wherein both said outer capsule and said inner capsule are provided with a vacuum therein so that air friction does not affect the acceleration of said inner capsule or said test cell.

7. A test drop facility, as set forth in claim 3, wherein said outer elongated capsule includes:

a cylindrical body;

an upper outwardly converging conical truncated end connected to said body;

a lower outwardly converging conical end connected to said body;

a nose connected to and closing the lower end of said outer capsule;

a cap made of magnetic material connected to and closing the upper conical end of said outer capsule; and said inner capsule includes:

a cylindrical body;

an upper outwardly converging truncated conical end connected to said body;

a lower outwardly converging truncated conical end connected to the bottom of said body;

a nose connected to and closing said lower conical end; and a cap made of magnetic material connected to and closing the upper conical end of said inner capsule, said cap of said outer capsule being adapted to hold said outer capsule in position at the top of a test drop tower by an electromagnet prior to a test and said cap of said inner capsule being adapted to hold said inner capsule at the top of said outer capsule prior to a test.

*8. A free-fall test facility for conducting experiments in a fractional or reduced gravity environment comprising drop tower means providing a vertical drop path, a test capsule, means for releasably securing said test capsule to said drop tower means at the upper end of said vertical drop path and releasable to permit said test capsule to free-fall along said drop path, container means in said test capsule for housing an experiment and movable relative to said test capsule during free-fall of said test capsule, and means for accelerating said container means relative to said test capsule when said test capsule is in free-fall along said drop path.*

*9. A free-fall test facility as defined in claim 8 wherein said means for accelerating said container means includes spring means for exerting a force on said container means to provide said acceleration.*

*10. A free-fall test facility os defined in claim 9 wherein said spring means includes a constant force spring.*

*11. A free-fall test facility as defined in claim 8, wherein said drop tower means further includes means providing a container at the lower end of said drop path and wheat in said container to be impacted by said test capsule to decelerate said test capsule.*

*12. A free-fall test facility for conducting experiments in a fractional or reduced gravity environment comprising drop tower means providing a vertical drop path, a first capsule, means for releasably securing said first capsule to said drop tower and releasable to permit said first capsule to free-fall along said path, a second capsule disposed within said first capsule and movable relative to said first capsule, container means in said second capsule for housing an experiment and movable relative to said second capsule during free-fall of said first capsule and means for accelerating said container means relative*

*to said second capsule when said first capsule is in free-fall along said drop path.*

*13. A free-fall test facility as defined in claim 12, wherein said means for accelerating said container means includes constant force spring means operatively connected to said container means and said second capsule.*

References Cited

The following references, cited by the Examiner, are of record in the patented file of this patent or the original patent.

UNITED STATES PATENTS

| | | | |
|---|---|---|---|
| 2,618,156 | 11/1952 | Boucher | 73—382 |
| 3,122,023 | 2/1964 | Gledhill | 73—503 X |
| 3,141,340 | 7/1964 | Boehm | 73—382 X |

CHARLES A. RUEHL, Primary Examiner

U.S. Cl. X.R.

73—12, 53